(12) United States Patent
Moulsley et al.

(10) Patent No.: US 8,014,730 B2
(45) Date of Patent: Sep. 6, 2011

(54) METHOD OF OPERATING A COMMUNICATION SYSTEM, A RADIO STATION, AND A RADIO COMMUNICATION SYSTEM

(75) Inventors: Timothy J. Moulsley, Caterham (GB); Matthew P. J. Baker, Canterbury (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 813 days.

(21) Appl. No.: 11/718,617

(22) PCT Filed: Nov. 8, 2005

(86) PCT No.: PCT/IB2005/053660
§ 371 (c)(1),
(2), (4) Date: May 4, 2007

(87) PCT Pub. No.: WO2006/051481
PCT Pub. Date: May 18, 2006

(65) Prior Publication Data
US 2009/0104879 A1    Apr. 23, 2009

(30) Foreign Application Priority Data
Nov. 10, 2004  (GB) .................................. 0424817.5

(51) Int. Cl.
*H04B 1/00* (2006.01)

(52) U.S. Cl. ............. 455/68; 455/69; 455/515; 455/522
(58) Field of Classification Search ................... 455/69, 455/68, 522, 414.1, 414.4, 432.2, 452.1, 455/452.2, 511, 515, 67.11, 126; 370/441, 370/318, 477
See application file for complete search history.

(56) References Cited

U.S. PATENT DOCUMENTS

| 6,912,228 | B1 * | 6/2005 | Dahlman et al. ............. 370/441 |
| 2004/0218559 | A1 * | 11/2004 | Kim et al. .................... 370/318 |
| 2006/0098688 | A1 * | 5/2006 | Parkvall et al. .............. 370/477 |

FOREIGN PATENT DOCUMENTS

| EP | 1039657 | 9/2000 |
| EP | 1306982 | 5/2003 |
| WO | 0191322 A1 | 11/2001 |
| WO | 03085878 | 10/2003 |
| WO | 2006033059 | 3/2006 |

\* cited by examiner

*Primary Examiner* — John Lee

(57) ABSTRACT

A radio communication system has a plurality of transmission formats available for the transmission of data signals by a sending station, and a pilot signal is transmitted to enable channel estimation by the receiving station. A receiving station transmits a control signal indicating the transmission formats that the sending station may use for transmitting the data signals. The sending station selects one of the indicated transmission formats for transmitting a data signal and derives a transmission power level for the pilot signal from the control signal. The transmission power level of the pilot signal may be independent of the selected transmission format, or may depend on selected transmission format.

30 Claims, 4 Drawing Sheets

United States Patent US 8,014,730 B2

METHOD OF OPERATING A COMMUNICATION SYSTEM, A RADIO STATION, AND A RADIO COMMUNICATION SYSTEM

The invention relates to a radio communication system, a method of operating a radio communication system, a radio station, and a method of operating a radio station, in particular where, in addition to transmitting a data signal, a pilot signal is transmitted to enable a receiving station to perform channel estimation.

It is known to transmit a pilot signal in addition to a data signal to enable a receiving station to perform channel estimation. Such a technique is used, for example, in mobile communications systems such as GSM and the Universal Mobile Telecommunication System (UMTS). The data signal comprises arbitrary symbols according to the information to be conveyed, and the pilot signal comprises pre-determined symbols. The channel estimation can take different forms, for example an estimation of propagation loss, enabling the receiving station to generate and transmit power control (TPC) commands to control the transmit power of the sending station, generally known as closed loop power control, or an estimation of multipath propagation, enabling the receiving station to apply equalisation to compensate for the effects of multipath propagation. Also, the pilot symbols may be used by the receiving station to generate a phase reference for use in demodulating the data symbols. In the present specification the terms "sending station" and "receiving station" refer to, respectively, the station that transmits the data signal and pilot signal and the station that receives the data signal and pilot signal. The sending station and receiving station are also referred to respectively as the "first station" and the "second station".

In closed loop power control schemes, such as employed in UMTS, the receiving station performs channel estimation on a received signal by measuring a parameter of the signal that is indicative of signal quality, such as signal-to-interference ratio (SIR) or signal-to-noise ratio (SNR), and comparing the measured value with a target value of the parameter. The result of the comparison is used to generate a TPC command, which is a command to either to increase or decrease transmit power by a specific amount in order to drive the measured parameter towards the target value. In some schemes the TPC command may indicate that no change in transmit power level is required.

The TPC commands transmitted by the receiving station are used by the sending station to control the transmit power of both the pilot signal and the data signal. The transmit power level of the data signal need not be identical to the transmit power level of the pilot signal, but there may be an offset between these two levels, the offset being maintained at a defined ratio as the levels are varied in accordance with the received TPC commands. This offset ratio is selected to apportion the transmit power between the data signal and the pilot signal in an efficient manner, for example, to balance the accuracy of channel estimation with the reliability of data demodulation, while avoiding the generation of unnecessary interference.

An outer loop power control procedure may be used to adjust the target value of the measured parameter in such a way that the data signals are received with sufficient reliability.

Data may be transmitted using different transmission formats, with a transmission format being selected to suit the priority and target reliability of the data and the prevailing conditions such as signal level and channel loading. A transmission format is a combination of one or more parameters such as: modulation method, symbol rate, bit rate, number of bits per packet, channel coding rate, transmit power level, source coding scheme, or spreading factor. In this case the transmit power level of the pilot signal is nominally constant, being independent of the transmission format of the data, or of changes in the transmission format, and transmit power level of the data signal is dependent on the current transmission format. Therefore, the offset ratio is dependent on the current transmission format of the data signal. If closed loop transmit power control is used, the transmit power level of the pilot and data signals are varied in accordance with the received TPC commands, and the offset ratio is maintained constant.

An object of the invention is improve the operation of a communication system that uses pilot signals for channel estimation.

According to a first aspect of the invention there is provided a method of operating a radio station, comprising:
receiving a control signal indicative of at least one transmission format, and
in response to receiving the control signal,
transmitting a data signal in at least a selected one of the indicated transmission formats,
transmitting a pilot signal, and
deriving the transmit power level of the pilot signal from the control signal.

According to a second aspect of the invention there is provided a radio station for transmitting a data signal, comprising:
means for receiving a control signal indicative of at least one transmission format;
means for transmitting a data signal in at least one of the indicated transmission formats;
means for transmitting a pilot signal, and
means for deriving the transmit power level of the pilot signal from the control signal.

According to a third aspect of the invention there is provided a radio station for receiving a data signal comprising:
means for transmitting a control signal indicative of at least one transmission format;
means for receiving a data signal transmitted using at least one of the indicated transmission formats;
means for receiving a pilot signal transmitted during transmission of the data signal;
means for measuring a parameter of the received pilot signal;
means for comparing a measured value of the parameter with a target value of the parameter;
means for generating transmit power control commands in response to the comparison;
means for transmitting the transmit power control commands; and
means for adjusting the target value during reception of the data signal by an amount dependent on the indicated at least one transmission format.

According to a fourth aspect of the invention there is provided a radio communication system comprising a first station in accordance with the second aspect of the invention and a second station comprising:
means for transmitting the control signal indicative of the at least one transmission format;
means for receiving the pilot signal and data signal;
means for performing channel estimation on the pilot signal; and
means for demodulating the data signal.

According to a fifth aspect of the invention there is provided a method of operating a radio communication system comprising a first station and a second station, the method comprising, at the second station:

transmitting to the first station a control signal indicative of at least one transmission format, and at the first station, in response to receiving the control signal, transmitting a data signal in at least a selected one of the indicated transmission formats, transmitting a pilot signal, and deriving the transmit power level of the pilot signal from the control signal.

According to a sixth aspect of the invention there is provided a method of operating a radio station, comprising:

transmitting a control signal indicative of at least one transmission format;

receiving a data signal transmitted using at least one of the indicated transmission formats;

receiving a pilot signal transmitted during transmission of the data signal;

measuring a parameter of the received pilot signal;

comparing a measured value of the parameter with a target value of the parameter;

generating transmit power control commands in response to the comparison;

transmitting the transmit power control commands; and adjusting the target value during reception of the data signal by an amount dependent on the indicated at least one transmission format.

The invention enables the receiving station to have control over the pilot signal transmit power level used with the data signal transmission, thereby improving reception reliability and improving system efficiency.

For example the receiving station may cause a temporary increase the pilot signal power level for the duration of the data signal to improve the reliability of channel estimation. The magnitude of such an increase may be prescribed directly or indirectly in the control message, or may be selected by the sending station, dependent on its choice of transmission format from among a plurality of transmission formats indicated as permissible by the receiving station in the control signal.

One way of the receiving station indicating indirectly the transmit power level of the pilot signal is for the control message to indicate a single permitted transmission format, and for the sending station to apply a predetermined pilot signal transmit power level associated with that indicated format.

One way of the receiving station indicating indirectly the transmit power level of the pilot signal when a plurality of transmission formats are indicated by the control message is for the sending station to identify which of the transmission formats complies with a predetermined criterion such as having the highest bit rate, having the highest data signal power level, or highest offset ratio, and to employ a predetermined pilot signal transmission power level associated with that identified transmission format. This identified transmission format need not be the format selected for transmitting the data signal. When a plurality of transmission formats are indicated as permitted, the sending station is able to select a transmission format most suited to the data it has to send.

The control signal may implicitly indicate a plurality of transmission formats by explicitly indicating a single transmission format which represents a permitted maximum value of a characteristic such as transmit power level, transmit power offset ratio, transmit power difference, bit rate, number of data bits.

The data signal may comprise a plurality of transmission formats transmitted in turn, for example for different types of data. The transmit power of the pilot signal may be increased for the duration of the whole data signal, or may be set independently for each transmission format. Furthermore, the data signal may be discontinuous, including time periods when transmission of the data signal ceases temporarily. During these time periods the transmit power of the pilot signal may be reduced, for example to reduce the average interference generated, or may continue at the same level.

In one embodiment of the invention, closed loop power control is used and the receiving station is able to select the target received signal quality knowing the transmit power level that the sending station will use for the pilot signal.

The invention will now be described, by way of example only, with reference to the accompanying drawings wherein.

Figure 1:
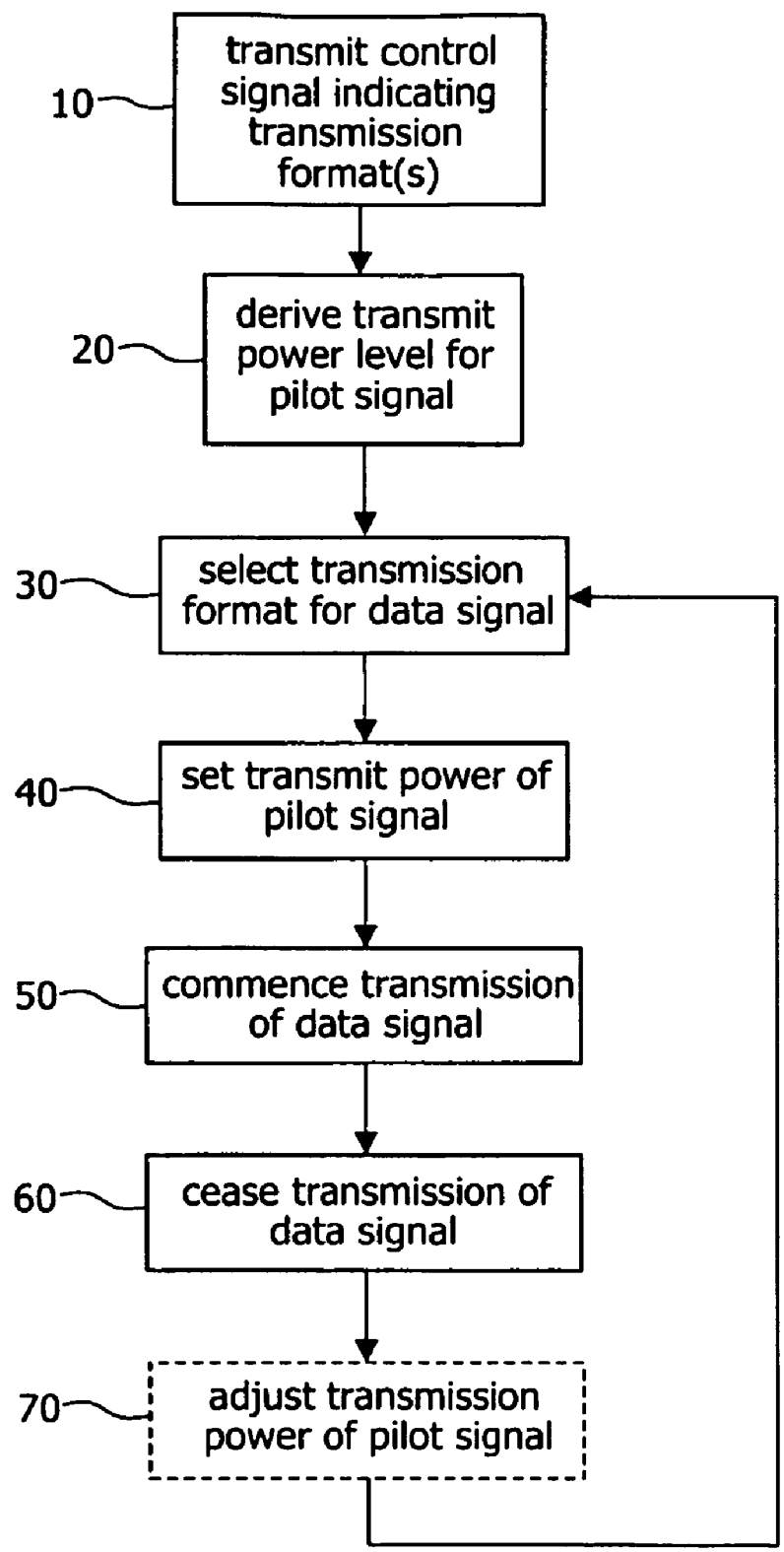
FIG. 1 is a flow chart of a method of transmitting data in accordance with the invention.

Referring to FIG. 1, at step 10 the receiving station transmits to the sending station a control signal which indicates at least one permitted transmission format that the sending station may use for transmitting data. The sending station receives the control signal and at step 20 derives from the control signal a transmit power level for the pilot signal. For deriving from the control signal the transmit power level for the pilot signal there may be a predetermined transmit power level, or power step change, associated with each transmission format indicated by the control signal.

At step 30 the sending station selects one of the indicated transmission formats for the transmission of a data signal. The selected transmission format may be, for example:

a) the transmission format indicated by the receiving station, where only one transmission format is indicated;

b) where only one transmission format is indicated and represents a permitted maximum value of a characteristic, any transmission format that uses a value of the characteristic less than or equal to the permitted maximum value;

c) any of a plurality of indicated formats, whichever is most suited to the data to be transmitted.

At step 40 the sending station sets the transmission power of the pilot signal according to the value derived at step 20. This may comprise commencing transmission of the pilot signal, or adjusting the transmit power level if transmission of the pilot signal is already in progress.

In some embodiments, steps 30 and 40 may be reversed.

At step 50 transmission of the data signal commences using the transmission format selected at step 30.

At step 60 transmission of the data signal ceases, for example after transmission of one or more data packets.

In some embodiments, steps 30, 50 and 60 may be omitted, for example if the time available for transmitting the data signal expires before the sending station is ready to transmit the data signal.

At step 70, optionally the transmission power of the pilot signal is adjusted. The pilot power adjustments at steps 40 and 70 may, for example, be an increase and a decrease respectively, and may, for example, be nominally equal in magnitude, such that the transmission power after the decrease is nominally equal to the transmission power before the increase. However, closed loop transmit power control may also be in operation whereby the receiving station performs channel estimation on the received pilot signal and transmits to the sending station transmit power control (TPC) commands. The sending station receives the TPC commands and adjusts its transmit power in response to these TPC commands. When closed loop transmit power control is in operation the increase and decrease at respectively steps 30 and 70 may differ by an amount corresponding to the difference of any coincident TPC commands.

If there is more data to be transmitted, the process loops back to step 30. For each pass around the loop, a different transmission format may be selected for the data signal, and the transmit power of the pilot signal may be set dependent on the data transmission format or maintained at the value derived at step 20.

The control signal may signify a time period during which the data transmission is permitted, and data transmission ceases when this time period has expired, and also the transmit power of the pilot signal may be decreased; or otherwise adjusted towards its original level, when this time period has expired. This decrease may comprise discontinuing transmission of the pilot signal.

After the data transmission has ceased and the permission to transmit has expired, the flow may loop back to step 10.

FIGS. 2 to 5 each illustrate two periods of transmission of data signal using two transmission formats $F_1$ and $F_2$ between time $t_1$ and $t_2$ and between time $t_3$ and $t_4$ respectively. The control signal, not illustrated, is received at time $t_0$ and signifies a time period during which data transmission is permitted. This permitted time period may be between time $t_1$ and $t_4$, or may commence earlier or end later. For clarity, the permitted time period is not illustrated in FIGS. 2 to 5.

Figure 2:
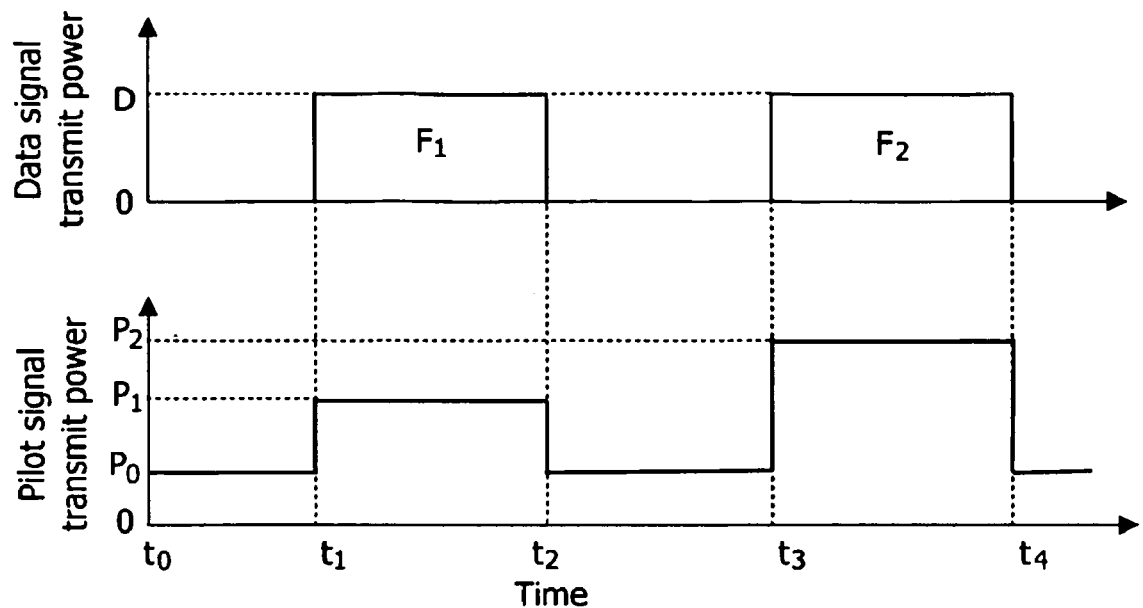
FIGS. 2 to 5 are graphs illustrating the transmit power level of a pilot signal and data signal for different embodiments of the invention.

Referring to FIG. 2, both data transmission formats $F_1$ and $F_2$ use the same transmit power level and with the transmission of the data signal ceasing outside of times $t_1$ to $t_2$ and $t_3$ to $t_4$. Format $F_2$ may use, for example, a higher bit rate than format $F_1$. Also in FIG. 2 is illustrated the transmission of the pilot signal, at a level $P_0$ while transmission of the data signal is discontinued, and at levels $P_1$ and $P_2$ during, respectively, transmission of the data signal using transmission formats $F_1$ and $F_2$. The offset ratio is $D/P_1$ during the time period $t_1$ to $t_2$, and $D/P_2$ during the time period $t_3$ to $t_4$. The power level $P_2$ is higher that $P_1$ in order to increase the accuracy of channel estimation during the higher bit rate format $F_2$; such an increase in pilot signal power operates to compensate for a reduced reliability of the higher bit rate data signal. The changes in power level of the pilot signal are illustrated as occurring at the same times as the commencement and cessation of transmission of the data signal; in practice the changes need not occur at the same times, although preferably the transmit power of the pilot signal is increased for the whole of each period during which the data signal is transmitted.

Figure 3:
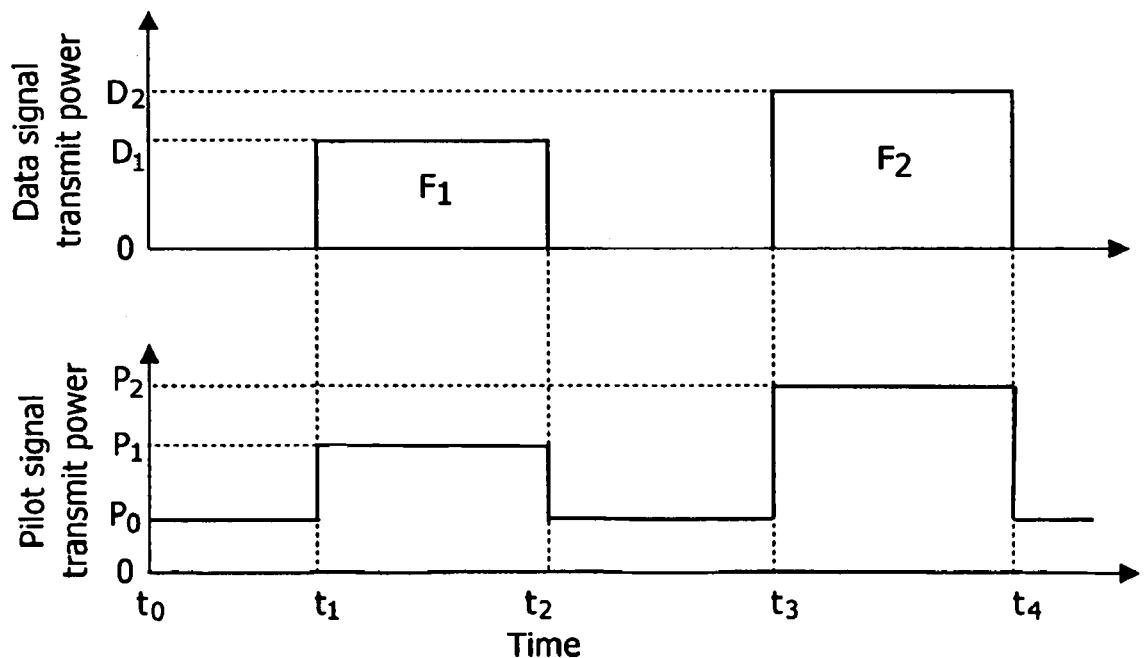

FIG. 3 illustrates another example of transmit power levels with two permitted transmission formats $F_1$ and $F_2$. FIG. 3 is identical to FIG. 2, except that transmission of the data signal using transmission format $F_1$ is at power level $D_1$ and transmission of the data signal using transmission format $F_2$ is at a higher power level $D_2$. The offset ratio is $D_1/P_1$ during the time period $t_1$ to $t_2$, and $D_2/P_2$ during the time period $t_3$ to $t_4$. The increase in data signal power from $D_1$ to $D_2$, and the increase in pilot signal power from $P_1$ to $P_2$, both operates to compensate for a reduced reliability of the higher bit rate data signal of transmission format $F_2$.

Figure 4:
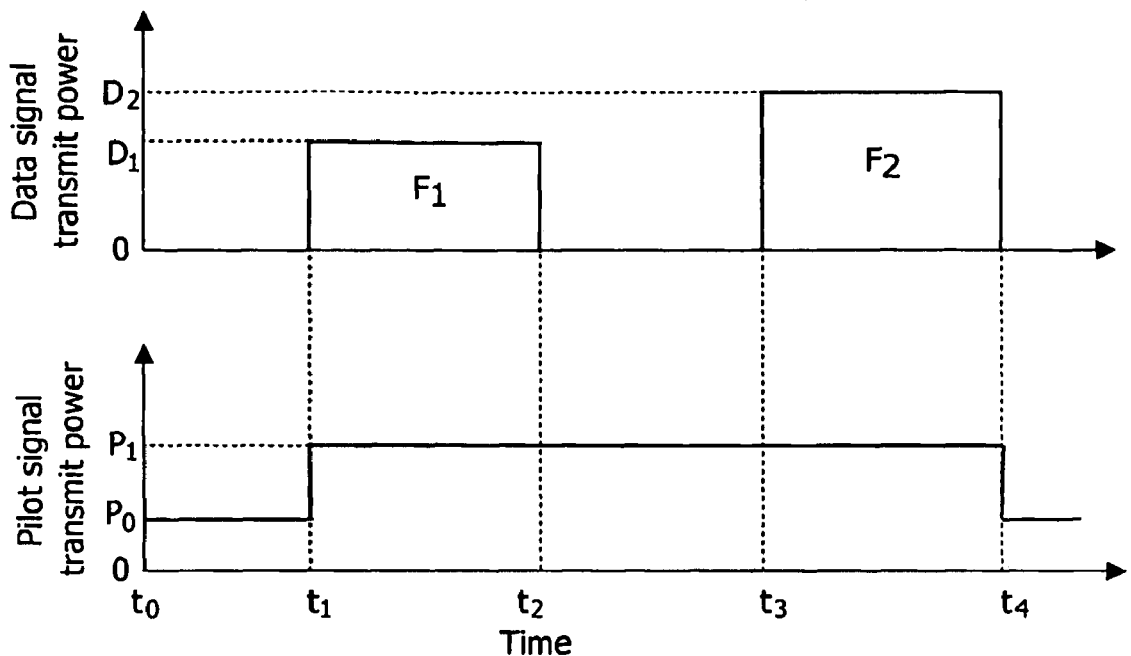

FIG. 4 illustrates another example in which transmission of the data signal using transmission format $F_1$ is at power level $D_1$ and transmission of the data signal using transmission format $F_2$ is at a higher power level $D_2$, but the pilot signal is transmitted at a power level $P_1$ from commencement to termination of data signal transmission, and is at the lower level $P_0$ outside the data signal transmission period.

Note that the increase in pilot signal power may take place at a predetermined time offset from receipt of the control signal at $t_0$, and the time period between $t_0$ and the start of data transmission may be arbitrary. Similarly, the decrease in pilot signal power may take place at a predetermined time offset from the increase in pilot signal power or from $t_0$, and the time between the end of data transmission and the power decrease may be arbitrary.

In some embodiments, there may not be any data transmission between the two adjustments of the control channel power, for example if the permission to transmit data has expired before the sending station is ready to transmit the data.

Figure 5:
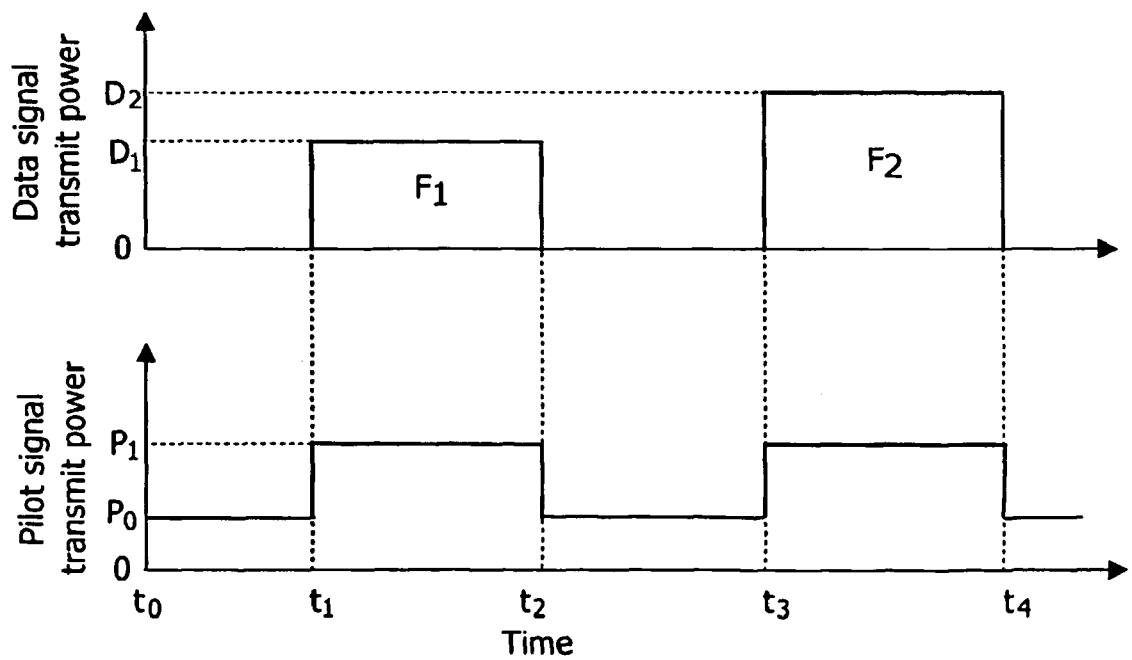

The example of FIG. 5 is the same as in FIG. 4 except that during the pause in data signal transmission from time $t_2$ to $t_3$ the transmit power of the pilot signal is reduced.

If the receiving station generates TPC commands for transmission to the sending station for the purpose of closed loop transmit power control, by comparison of a measured parameter of the received signal with a target value, during the temporary increase in the transmit power level of the pilot signal the target value may be adjusted by an amount dependent on the one or more indicated transmission formats of the data signal signalled by the receiving station. FIGS. 2 to 5 do not show any variation due to closed loop power control, which would be superimposed on the power variations illustrated.

Figure 6:
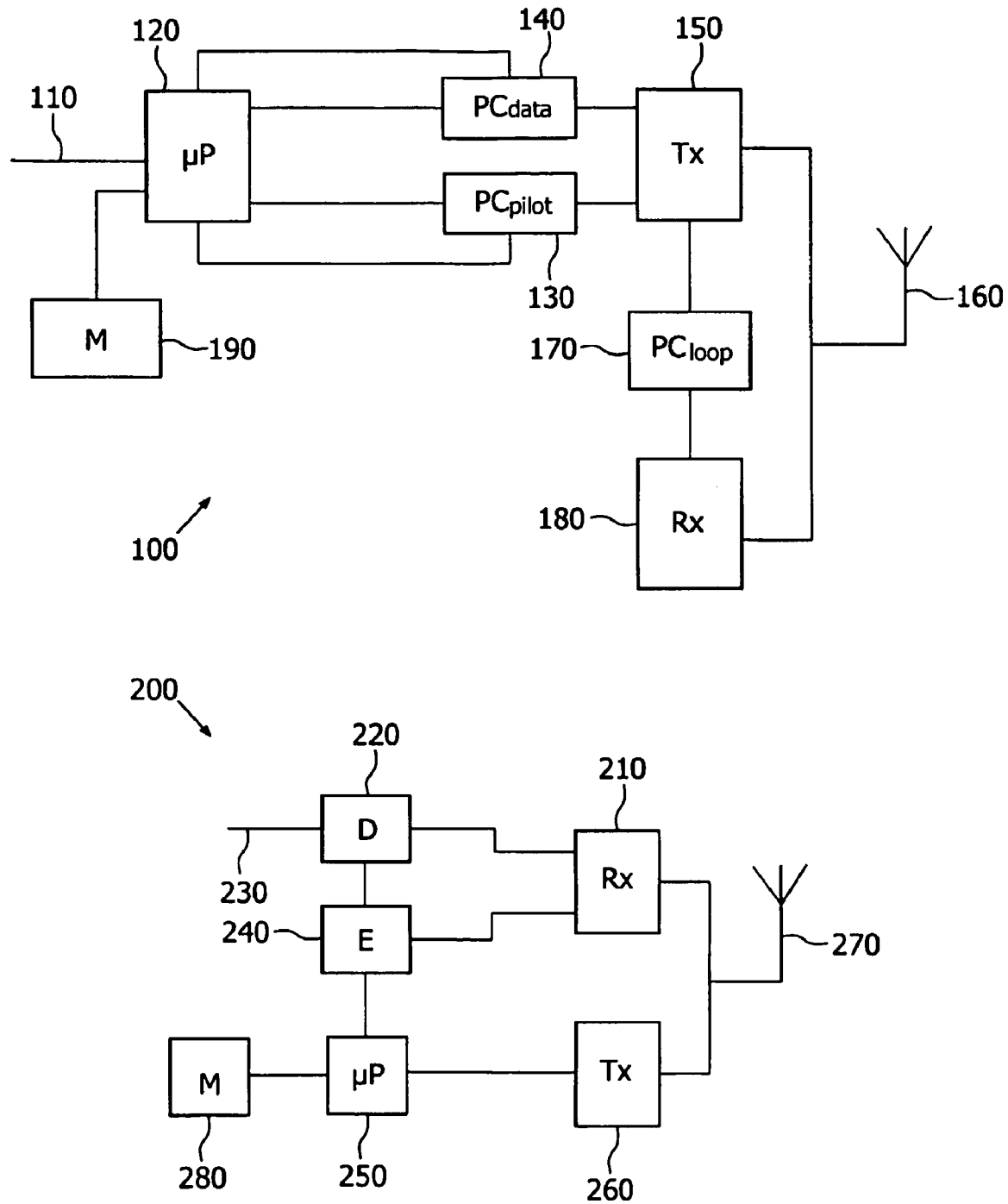
FIG. 6 is a block schematic diagram of a radio communication system.

Referring to FIG. 6, there is illustrated a block schematic diagram of a radio communication system comprising a sending station 100 and a receiving station 200. For example, the sending station 100 may be a mobile apparatus and the receiving station 200 may comprise fixed equipment of a mobile communication network.

The sending station 100 comprises a processing means (puP) 120 coupled to an input 110 for receiving data to be transmitted in a data signal, and coupled to a memory (M) 190 for storing characteristics of available transmission formats. The sending station also comprises a receiver (Rx) 180 coupled to an antenna 160 for receiving from the receiving station 200 an indication of one or more transmission formats.

A single format for the transmission of data may be selected by the receiving station 200 and signalled to the sending station 100. Alternatively, the receiving station 200 may signal to the sending station 100 an indication of more than one permitted transmission format, and the processing means (μP) 120 of the sending station 100 selects from the permitted transmission formats indicated, depending on, for example, the amount of data available to transmit, or the amount of power available for transmission.

The processing means (μP) 120 is adapted to select from the memory 190 the characteristics of the selected transmission format for transmission of the data and to encode the data for transmission, which may include subdividing the data into a plurality of data packets. The processing means (μP) 120 is coupled to a transmitter (Tx) 150 for transmission of the data signal via the antenna 160. The transmission of the data signal may be discontinuous because, for example, the arrival of data at the input 110 is discontinuous. Optionally, the data signal for transmission is supplied to the transmitter from the processing means (μP) 120 via a data signal power controller (PC$_{data}$) 140 which is coupled to the processing means (μP) 120 for controlling the transmit power level of the data signal dependent on the transmission format, according to characteristics stored in the memory 190. For example, in the scenario of FIG. 2, an indication of the offset ratios $D/P_1$ and D/P$_2$ may be stored in the memory 190, being associated with respectively transmission formats F$_1$ and F$_2$ respectively, and in the scenario of FIG. 3 an indication of the offset ratios D$_1$/P$_1$ and D$_2$/P$_2$ may be stored, being associated with respectively transmission format F$_1$ and F$_2$.

The processing means (μP) 120 is also adapted to generate a pilot signal comprising pre-determined pilot symbols suitable for channel estimation by the receiving station and is coupled via a pilot signal power controller (PC$_{pilot}$) 130 to the transmitter for transmission of the pilot signal. The pilot signal is transmitted during at least some of the time while the data signal is being transmitted, and preferably continuously throughout transmission of the data signal, and during at least some of the time while transmission of the data signal is discontinued. The pilot signal power controller 130 is coupled to the processing means (μP) 120 for controlling the transmit power level of the pilot signal dependent on the control signal received from the receiving station, and employing characteristics stored in the memory 190, and for controlling the transmit power level P$_0$ of the pilot signal while transmission of the data signal is discontinued.

The receiver 180 may be adapted to receive TPC commands transmitted by the receiving station 200 for the purpose of closed loop transmit power control, and the sending station 100 may comprise a loop power controller (PC$_{loop}$) 170 coupled to the receiver 180 for decoding the received TPC commands and coupled to the transmitter 150 for adjusting the transmit power level of the pilot signal and the data signal in accordance with the received TPC commands. The closed loop transmit power control is superimposed on the changes in transmit power level introduced by the pilot signal power controller (PC$_{pilot}$) 130 and by the data signal power controller (PC$_{data}$) 140.

The receiving station 200 comprises a processing means (μP) 250 for determining permitted transmission formats, a transmitter (Tx) 260 coupled to an antenna 270 for transmitting a control signal comprising an indication of one or more permitted transmission formats, and a receiver (Rx) 210 coupled to the antenna 270 for receiving the pilot signal and data signal transmitted by the sending station 100. Coupled to the receiver 210 is a data demodulator (D) 220 for demodulating the received data signal and delivering the demodulated data on an output 230.

Coupled to the receiver 210 is an estimation means (E) 240 for performing channel estimation on the received pilot signal symbols. An output of the estimation means 240 may be coupled to the data demodulator 220 to enable the result of channel estimation to be used in demodulating the data, for example, to enable the data demodulator 220 to generate a phase reference or to perform equalisation.

The processing means (μP) 250 may be coupled to an output of the estimation means 240 for generating TPC commands from the result of channel estimation, and is coupled to the transmitter (Tx) 260 for transmitting the TPC commands to the first station 100 via the antenna 270. In order to generate TPC commands, the estimation means 240 measures a parameter of the received pilot signal, for example SIR or SNR, and compares the value of the measured parameter with a target value. When the transmit power level of the pilot signal is temporarily increased by the sending station 100 during transmission of the data signal, without further measures at the receiving station 200 the TPC commands would tend to restore the transmit power level of the sending station 100. Therefore, the receiving station 200, under the control of the processing means 250, also temporarily increases the target value of the measured parameter by an amount dependent on the one or more indicated transmission formats of the data signal for the period during which the transmit power level of the pilot signal is temporarily increased. For this purpose, the processing means 250 of the receiving station is coupled to a memory 280 for storage of indications of target values of the estimated channel parameters for each of the available transmission formats of the data signal.

Optionally the values of any, or all, of the indications stored in the memory 190 of the sending station may be changed under the control of the receiving station. In this case the these indications, and these indications may be transmitted to the sending station 100 via the transmitter 260.

Optionally transmission of the pilot signal may be interrupted temporarily during transmission of the data signal.

In some embodiments the pilot signal or data signal may be transmitted at substantially the same power as another signal or data field, which may for example carry TPC commands, transport format signalling or other feedback signalling. In other embodiments there may be a pre-determined ratio between the power of the pilot signal and the power of the other signal or data field. In both cases changing the power of the pilot signal would also change the power of the other signal or data field by the corresponding amount. In some other embodiments the ratio between the pilot power and the power of the other signal or data field may not be fixed, in which case the period of an increase in pilot power could be associated with a change in the ratio between pilot power and the power of the other signal or data field. Such a change could be between one predetermined value of the ratio and another.

In the present specification and claims the word "a" or "an" preceding an element does not exclude the presence of a plurality of such elements. Further, the word "comprising" does not exclude the presence of other elements or steps than those listed. The inclusion of reference signs in parentheses in the claims is intended to aid understanding and is not intended to be limiting. From reading the present disclosure, other modifications will be apparent to persons skilled in the art. Such modifications may involve other features which are already known in the art of radio communications and which may be used instead of or in addition to features already described herein.

The invention claimed is:

1. A method of operating a radio station, comprising:
   receiving a control signal indicative of at least one transmission format,
   in response to receiving the control signal, transmitting a data signal in at least a selected one of the indicated transmission formats,
   transmitting a pilot signal associated with predetermined pilot parameters for channel estimation at predetermined time offsets, the predetermined pilot parameters being compared to target values for generating transmit power control commands, and
   deriving the transmit power level of the pilot signal from the control signal;
   wherein transmission of the data signal is discontinuous and wherein the transmit power level of the pilot signal is decreased during at least some of the time while transmission of the data signal is discontinued.

2. The method as claimed in claim 1, wherein deriving the transmit power level of the pilot signal comprises selecting the transmit power level of the pilot signal dependent on the currently selected transmission format used for transmitting the data signal.

3. The method as claimed in claim 2, wherein the data signal comprises a plurality of data blocks transmitted sequentially using a plurality of transmission formats and wherein the transmit power level of the pilot signal is dependent on the current transmission format.

4. The method as claimed in claim 1, wherein deriving the transmit power level of the pilot signal comprises selecting the transmit power level of the pilot signal dependent on a characteristic of at least one of the indicated transmission formats.

5. The method as claimed in claim 4, wherein the transmit power level of the pilot signal is dependent on the maximum value of one of the following characteristics: a bit rate of each indicated transmission format; a transmit power level assigned to each indicated transmission format; a power difference between the data signal and the pilot signal assigned to each indicated transmission format.

6. The method as claimed in claim 4, wherein the data signal comprises a plurality of data blocks transmitted sequentially using a plurality of transmission formats and wherein the transmit power level of the pilot signal is independent of the current transmission format.

7. The method as claimed in claim 1, wherein the control signal is indicative of a single transmission format, wherein the single transmission format is representative of a permitted maximum value of a characteristic of the data signal, wherein the transmit power level of the pilot signal is dependent on the permitted maximum value, and the transmission of the data signal uses a value of the characteristic less than or equal to the permitted maximum value.

8. The method as claimed in claim 7, wherein the characteristic comprises: transmit power level of the data signal; transmit power offset ratio; transmit power difference between the data signal and pilot signal; bit rate; number of data bits.

9. The method as claimed in claim 1, wherein the derived transmit power level of the pilot signal takes initial effect at a predetermined time with respect to the receipt of the control signal.

10. The method as claimed in claim 1, comprising adjusting the transmit power level of the data signal and of the pilot signal in accordance with received closed loop power control commands and adjusting a target value of the closed loop by an amount dependent on the derived transmit power level of the pilot signal.

11. The method as claimed in claim 1, wherein the transmit power level of the pilot signal is derived by applying an offset with respect to a previous transmit power level of the pilot signal.

12. The method as claimed in claim 1, wherein the control signal is indicative of a time period in which the data signal may be transmitted, and wherein the transmit power level of the pilot signal is changed after expiry of the indicated time period.

13. The method as claimed in claim 1, wherein the ratio between the transmit power level of the pilot signal and the transmit power level of another signal is dependent on the indicated transmission format.

14. The method as claimed in claim 13, wherein the other signal carries at least one of a power control command, transport format indicator or other feedback signalling.

15. A radio station for transmitting a data signal, comprising:
   means for receiving a control signal indicative of at least one transmission format;
   means for transmitting a data signal in at least one of the indicated transmission formats;
   means for transmitting a pilot signal associated with predetermined pilot parameters for channel estimation at predetermined time offsets, the predetermined pilot parameters being compared to target values for generating transmit power control commands, and
   means for deriving the transmit power level of the pilot signal from the control signal;
   wherein transmission of the data signal is discontinuous and wherein the transmit power level of the pilot signal is decreased during at least some of the time while transmission of the data signal is discontinued.

16. The radio station as claimed in claim 15, wherein the means for deriving the transmit power level of the pilot signal is adapted to select the transmit power level of the pilot signal dependent on the currently selected transmission format used for transmitting the data signal.

17. The radio station as claimed in claim 16, wherein the means for transmitting the data signal is adapted to transmit a plurality of data blocks sequentially using a plurality of transmission formats and wherein the means for deriving the transmit power level of the pilot signal is adapted to select the transmit power level of the pilot signal dependent on the current transmission format used for transmitting the data signal.

18. The radio station as claimed in claim 15, wherein the means for deriving the transmit power level of the pilot signal is adapted to select the transmit power level of the pilot signal dependent on a characteristic of the indicated transmission formats.

19. The radio station as claimed in claim 18, wherein the means for deriving the transmit power level of the pilot signal is adapted to select the transmit power level of the pilot signal dependent on the maximum value of one of the following characteristics: a bit rate of each indicated transmission format; a transmit power level assigned to each indicated transmission format; a predetermined power difference between the data signal and the pilot signal assigned to each indicated transmission format.

20. The radio station as claimed in claim 18, wherein the means for transmitting the data signal is adapted to transmit a plurality of data blocks sequentially using a plurality of transmission formats and wherein the means (120) for deriving the transmit power level of the pilot signal is adapted to select the transmit power level of the pilot signal independently of the current transmission format.

21. The radio station as claimed in claim 15, wherein the control signal is indicative of a single transmission format, wherein the single transmission format is representative of a permitted maximum value of a characteristic of the data signal, wherein the means for deriving the transmit power level of the pilot signal is adapted to select the transmit power level of the pilot signal dependent on the permitted maximum value, and the means for transmitting the data signal is adapted to transmit the data signal using a value of the characteristic less than or equal to the permitted maximum value.

22. The radio station as claimed in claim 21, wherein the characteristic comprises: transmit power level of the data signal; transmit power offset ratio; transmit power difference between the data signal and pilot signal; bit rate; number of data bits.

23. The radio station as claimed in claim 15, wherein the means for deriving the transmit power level of the pilot signal is adapted to apply the initial derived transmit power level at a predetermined time with respect to the receipt of the control signal.

24. The radio communication system comprising a first station as claimed in claim 15 and a second station comprising:
   means for transmitting the control signal indicative of the at least one transmission format;

means for receiving the pilot signal and data signal; and means for demodulating the data signal.

25. The radio communication system as claimed in claim 24, the second station further comprising:

means for adjusting the target value during reception of the data signal by an amount dependent on the indicated at least one transmission format; and the first station further comprising: means for receiving the transmit power control command and means for adjusting the transmit power level of the pilot signal and the data signal in accordance with the transmit power control command.

26. The radio communication system as claimed in claim 25, wherein the means for adjusting the target value during reception of the data signal is adapted to adjust the target value by an amount dependent on the maximum value of one of the following characteristics: a bit rate of each indicated transmission format; a transmit power level assigned to each indicated transmission format; a power difference between the data signal and the pilot signal assigned to each indicated transmission format.

27. A radio station for receiving a data signal comprising:

means for transmitting a control signal indicative of at least one transmission format;

means for receiving a data signal transmitted using at least one of the indicated transmission formats;

means for receiving a pilot signal transmitted during transmission of the data signal, the pilot signal associated with predetermined pilot parameters for channel estimation at predetermined time offsets, the predetermined pilot parameters being compared to target values for generating transmit power control commands;

means for transmitting the transmit power control commands; and means for adjusting the target value during reception of the data signal by an amount dependent on the indicated at least one transmission format;

wherein transmission of the data signal is discontinuous and wherein the transmit power level of the pilot signal is decreased during at least some of the time while transmission of the data signal is discontinued.

28. The radio station as claimed in claim 27, wherein the means for adjusting the target value during reception of the data signal is adapted to adjust the target value by an amount dependent on the maximum value of one of the following characteristics: a bit rate of each indicated transmission format; a transmit power level assigned to each indicated transmission format; a power difference between the data signal and the pilot signal assigned to each indicated transmission format.

29. A method of operating a radio communication system comprising a first station and a second station, the method comprising, at the second station:

transmitting to the first station a control signal indicative of at least one transmission format, and at the first station, in response to receiving the control signal, transmitting a data signal in at least a selected one of the indicated transmission formats, transmitting a pilot signal associated with predetermined pilot parameters for channel estimation at predetermined time offsets, the predetermined pilot parameters being compared to target values for generating transmit power control commands, and deriving the transmit power level of the pilot signal from the control signal;

wherein transmission of the data signal is discontinuous and wherein the transmit power level of the pilot signal is decreased during at least some of the time while transmission of the data signal is discontinued.

30. A method of operating a radio station, comprising:

transmitting a control signal indicative of at least one transmission format;

receiving a data signal transmitted using at least one of the indicated transmission formats;

receiving a pilot signal transmitted during transmission of the data signal, the pilot signal associated with predetermined pilot parameters for channel estimation at predetermined time offsets, the predetermined pilot parameters being compared to target values for generating transmit power control commands;

transmitting the transmit power control commands; and adjusting the target value during reception of the data signal by an amount dependent on the indicated at least one transmission format;

wherein transmission of the data signal is discontinuous and wherein the transmit power level of the pilot signal is decreased during at least some of the time while transmission of the data signal is discontinued.

* * * * *